R. D. GREEN.
MILK CAN HOLDER AND PROTECTOR.
APPLICATION FILED AUG. 21, 1919.
1,346,451. Patented July 13, 1920.
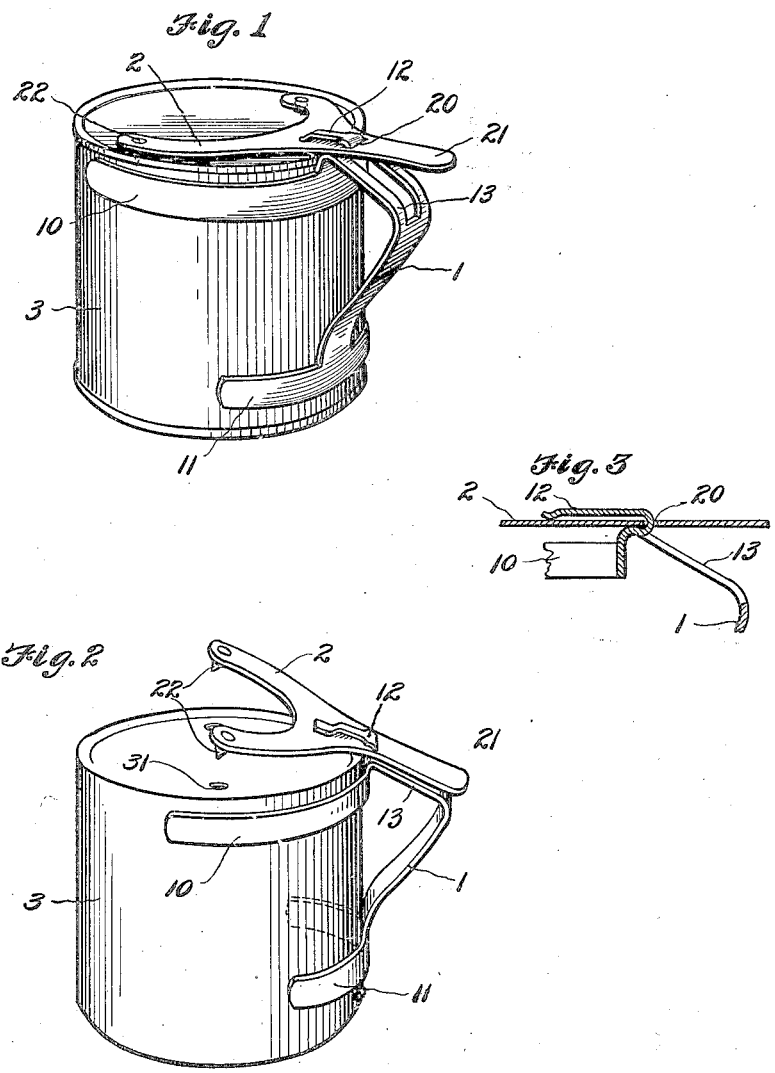
Inventor
RICHARD D. GREEN
By Reynolds & Cook
Attorney

UNITED STATES PATENT OFFICE.

RICHARD D. GREEN, OF SEATTLE, WASHINGTON.

MILK-CAN HOLDER AND PROTECTOR.

1,346,451.

Specification of Letters Patent.   Patented July 13, 1920.

Application filed August 21, 1919. Serial No. 318,880.

*To all whom it may concern:*

Be it known that I, RICHARD D. GREEN, a citizen of the United States, and resident of Seattle, Washington, have invented certain new and useful Improvements in Milk-Can Holders and Protectors, of which the following is a specification.

My invention comprises an improvement in milk can holders and protectors. It is particularly applicable to the type of can in which condensed milk is sold for family consumption.

The object of my invention is to provide a holder for a small milk can which may be quickly and easily applied or secured to the can, by means of which the can may be supported in use, which may be used to open the can, and which will protect the openings in the can and cover them at all times; while at the same time it will keep the holes open and clean. Another object is to produce a holder and protector as described above, having a minimum number of parts and of a cheap design.

My invention comprises the novel parts and combination of parts which are shown in the accompanying drawings, described in the specification, and defined by the claims terminating the specification.

In the accompanying drawings I have shown my invention in the form which is now preferred by me.

Figure 1, is a perspective view of a can showing my device attached thereto, and in the closed position.

Fig. 2, is a perspective view of a can with the device attached, the protector being raised.

Fig. 3, is a fragmentary detail in section of the hinge and spring portion of my device.

For the purpose of lifting a milk can 3, such as is supplied for household consumption, I attach a handle 1 thereto, by any suitable means.

As herein shown, this consists of a pair of arms 10 which embrace the curved sides of the can near the top, and extend more than half way about the can. These arms 10 grip the can between them and hold the handle 1 securely in place. To guide the lower end of the handle 1, I provide a pair of arms 11. These arms 11 extend about the curved surface of the can near its bottom, but preferably do not extend more than half way about the can. Arms 11 serve merely to guide the lower end of the handle 1 and to prevent its displacement. Both of the arms 10 and 11 are preferably formed integrally with the handle 1. It is evident however, that these arms might be formed separate, and be secured to the handle 1.

The protector 2 is adapted to cover the top of the can, or as much thereof as is necessary to cover and protect holes 31 which are punched in the top of the can. I prefer to form the protector 2 with a pair of arms, each carrying pins 22 adapted to enter the holes 31. Projecting from the protector 2 is a lifting handle 21. This extends outwardly over the handle 1. A slot 20 is cut in the protector near the base of the lifting handle 21.

In order to secure the protector 2 upon the handle 1 and to permit the pins 22 to be raised from the holes 31, I provide a peculiar type of combined hinge and spring. A tongue 12 is cut from the handle 1 and is bent upward, and projects through the slot 20 in the protector. It is then bent to one side and engages the protector 2 with its end. The material of which this tongue 12 is formed should be sufficiently resilient to act as a spring to force the pins 22 into the holes 31. I prefer that the tongue 12 be formed integrally with the handle 1 and that it be cut from the handle. This forms a simple, cheap and very efficient spring and hinge combined. A portion 13 of the handle 1 immediately beneath the lifting handle 21 may be flattened to form a stop to limit the downward motion of this lifting handle.

In use the device is placed upon a milk can by gripping the can with the arms 10. The holes 31 may then be punched in the top of the can by pressing the pins 22 into the top, as by striking them with a hammer. The spring 12 holds the protector 2 down upon the top of the can and the pins 22 close the holes 31 and at the same time keep them free from dirt or scum. The entire can may be lifted by means of the handle 1. When the lifting handle 21 is depressed the pins 22 are withdrawn from the holes 31 and the milk may be poured from the can.

I claim:

1. A milk can holder and protector comprising a handle, means secured thereto for gripping a can at its upper end, a guide secured to the lower end of said handle and curved to embrace the circumference of the can near its lower end, said guide being less in circular extent than a semi-circumference, a protector for the top of the can hingedly secured to said handle, and a spring acting to close said protector upon the top of the can.

2. A milk can holder and protector comprising a handle, means for securing said handle upon a can, a protector for the top of the can, and a tongue cut from said handle, said tongue being secured to said protector and acting to press it down upon the top of the can.

3. A milk can holder and protector comprising a handle, means for securing said handle upon a can, a protector for the top of the can having an outwardly projecting lifting handle and a slot cut therein at the base of the lifting handle, and a tongue cut from the first handle and extending upward through said slot to form a hinge for the protector, the end of said tongue engaging the protector and acting to force it downward upon the top of the can.

4. A milk can holder and protector comprising a handle, means for securing said handle upon a can, a protector for the top of the can comprising a pair of arms each carrying a pin adapted to fit a hole in the top near its edge and an outwardly projecting lifting handle, said protector having a slot cut therein near the base of the lifting handle, and a tongue cut from said first handle and extending upward through said slot to form a hinge for the protector, the end of said tongue engaging the protector and pressing it downward to force the pins into holes in the top of the can.

5. A milk can holder and protector comprising a handle, means for securing said handle upon a can, a protector for the top of the can having an outwardly projecting lifting handle and a slot cut therein at the base of the lifting handle, and a tongue cut from the first handle and extending upward through said slot to form a hinge for the protector, the end of said tongue engaging the protector and pressing it downward upon the top of the can, a portion of the first handle below the lifting handle being flattened to form a stop for said lifting handle.

Signed at Seattle, Washington, this 16th day of August, 1919.

RICHARD D. GREEN.